United States Patent [19]

Elliston

[11] 4,436,177
[45] Mar. 13, 1984

[54] TRUCK OPERATOR'S CAB WITH EQUIPMENT CONTROL STATION

[75] Inventor: Thomas L. Elliston, Fort Worth, Tex.

[73] Assignee: Hydra-Rig, Inc., Fort Worth, Tex.

[21] Appl. No.: 359,802

[22] Filed: Mar. 19, 1982

[51] Int. Cl.³ .............................................. B62D 33/06
[52] U.S. Cl. .................................. 180/324; 180/89.14; 296/190
[58] Field of Search ............... 180/324, 321, 323, 325, 180/326, 89.14, 89.19; 296/190

[56] References Cited

U.S. PATENT DOCUMENTS 2,198,407  4/1940  De Brun .......................... 180/324 X
4,121,684  10/1978  Stephens et al. .................. 180/89.14

FOREIGN PATENT DOCUMENTS 137756  6/1950  Australia .............................. 180/321
1634713  7/1970  Fed. Rep. of Germany ...... 180/324

Primary Examiner—John A. Pekar
Attorney, Agent, or Firm—Hubbard, Thurman, Turner & Tucker

[57] ABSTRACT

An operator cab for an over-the-road truck includes a forward disposed driver's compartment and a separate equipment control station disposed rearwardly of the driver's compartment. The control station includes a control panel disposed below a window in the rear wall of the cab. The cab provides standing head room at the control station whereby equipment on board the truck may be monitored and controlled from the control station and instrumentation on the driver's compartment instrument panel may also be viewed by the operator at the control station. A combination bunk and operator's seat is disposed across the interior of the cab between the driver's compartment and the control station and, together with foldable curtains disposed within the interior of the cab, defines a convertible sleeping compartment.

11 Claims, 3 Drawing Figures

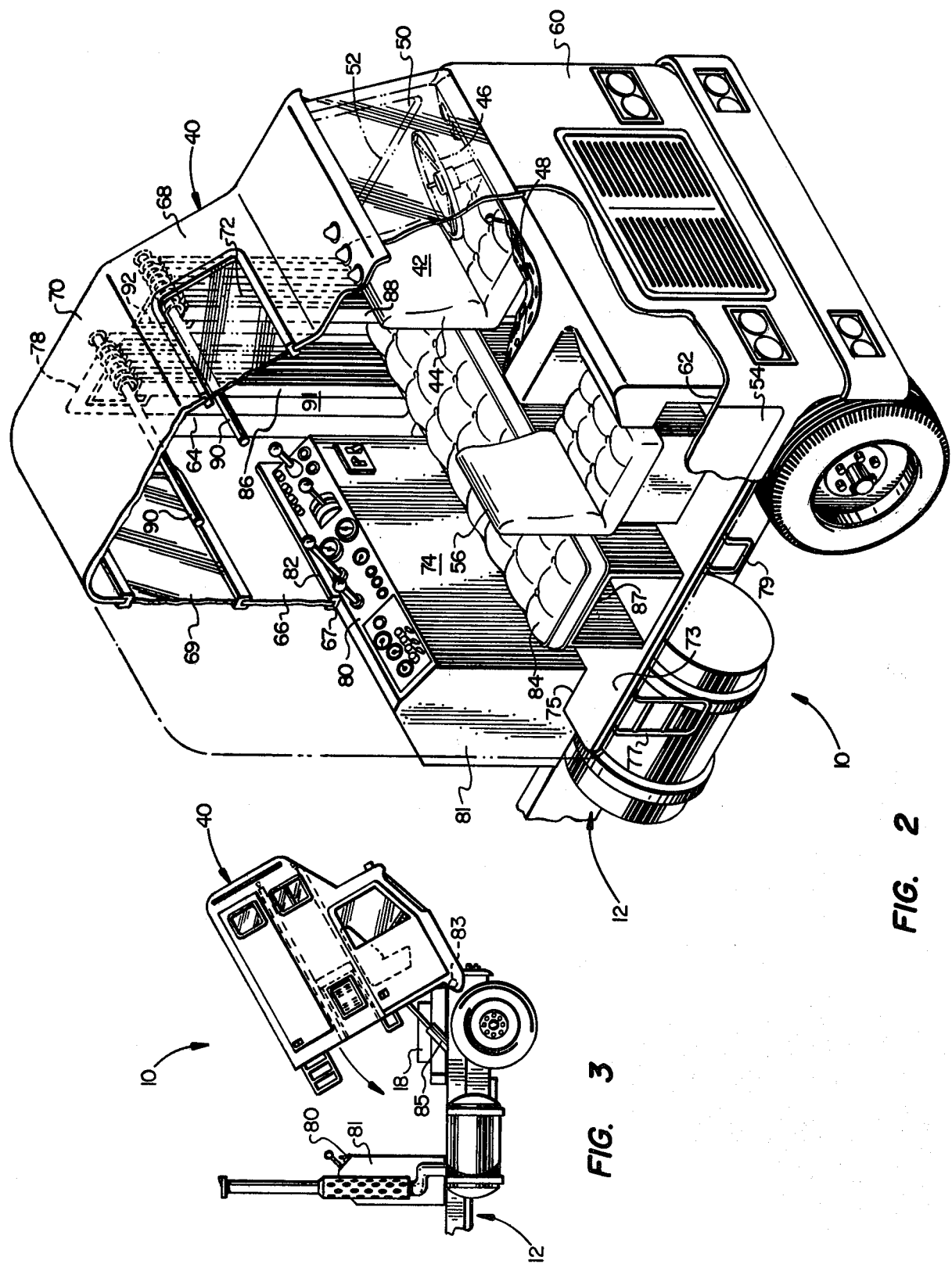

TRUCK OPERATOR'S CAB WITH EQUIPMENT CONTROL STATION

BACKGROUND OF THE INVENTION

1. Field of the Invention

The present invention pertains to a cab arrangement for a motor truck including a driver's compartment, a convertible sleeping compartment and a stand up operator control station for operating and monitoring various pieces of equipment on board the truck.

2. Background Art

There are many types of specialized truck mounted portable equipment units which require an operator control station for operating the equipment controls and for monitoring the performance of the equipment on board the vehicle. For example, specialized pieces of oilfield equipment which must be transported from one well site to another to perform well servicing and drilling operations are typically mounted on over the road truck chassis. An example of such a piece of equipment is a well servicing vehicle adapted for pumping fluids to be injected in the well to stimulate recovery of subterranean oil deposits. This type of equipment is relatively complex and requires substantially full time attention from an equipment operator at a control station preferably located on the vehicle itself. Moreover, many specialized equipment trucks utilize the vehicle main propulsion engine as a power source for on board pumps and other pieces of equipment and, accordingly, it is also necessary that the equipment operator be able to monitor the performance of the vehicle main engine while it is being utilized to power the on board equipment.

In the operation of certain types of portable equipment, such as the aforementioned well servicing trucks, it is also desirable to provide for the operator to be located in a relatively protected area, in the event of catastrophic equipment failure and for operations during inclement weather. Accordingly, it has been considered desirable to provide the equipment operator with a completely enclosed operator control station from which substantially all of the on board equipment can be observed and controlled. It has been still further considered desirable to provide an operator with a place to rest during periods when the equipment is being transported or is standing by awaiting further operations to take place before use of the equipment on board the vehicle.

Particularly in the art of specialized portable truck mounted equipment such as well servicing equipment, there has been a need for an operator control station which is located in a position where the equipment may be easily monitored and controlled, which is accessible to the truck main engine controls for monitoring, which is adapted to provide protection for the operator from adverse weather conditions as well as noise and the hazards associated with operating machinery, and to provide a rest area for the operator between times when the equipment is operated or for use during transport of the vehicle from one job site to another.

SUMMARY OF THE INVENTION

The present invention provides a unique operator cab arrangement for a motor truck of the type on which equipment on board the truck must be provided with a control station for operating and monitoring the equipment. In accordance with one aspect of the present invention, there is provided a combination motor truck cab having a driver's compartment including conventional driving controls and further including an operator's control station for operating and monitoring several pieces of specialized equipment mounted on board the truck. In accordance with another aspect of the present invention, there is provided a cab for a truck having an auxiliary or equipment control station disposed directly behind the driver's compartment and including a control panel mounted below a rearwardly facing window whereby an operator may observe equipment on the truck chassis while operating controls mounted on the control panel and observing instruments both on the control panel and on the instrument panel in the driver's compartment.

In accordance with yet another aspect of the present invention, there is provided a combination cab for an equipment vehicle having a driver's compartment, an equipment operator's control station disposed behind the driver's compartment and a convertible sleeping compartment disposed between the operator's control station and the driver's compartment. The convertible sleeping compartment includes a bunk which may also be used as a seat for the equipment operator while monitoring and controlling the on board equipment from the control station.

In accordance with yet a further aspect of the present invention, there is provided a combination driver and equipment operator cab of the cab-over-engine type arrangement whereby an equipment control panel is arranged across a transverse rear wall of the cab and wherein the control panel is fixed to the truck frame and the rear wall of the cab is recessed to enclose the control panel in the normal operating position of the cab. Accordingly, the control panel together with the attendant control cables and instrumentation conductors and wiring leading to the panel may be suitably fixed with respect to the truck frame while permitting tilting of the cab for access to the truck main propulsion engine.

The foregoing advantages and superior features of the unique cab arrangement of the present invention will be further appreciated upon reading the detailed description which follows in conjunction with the drawings.

BRIEF DESCRIPTION OF THE DRAWINGS

FIG. 2 is a perspective view of the cab of the truck illustrated in FIG. 1 partially broken to show details of the cab interior; and FIG. 3 is a detail side elevation view showing the cab in the tilted position.

DESCRIPTION OF THE PREFERRED EMBODIMENT

Figure 1:
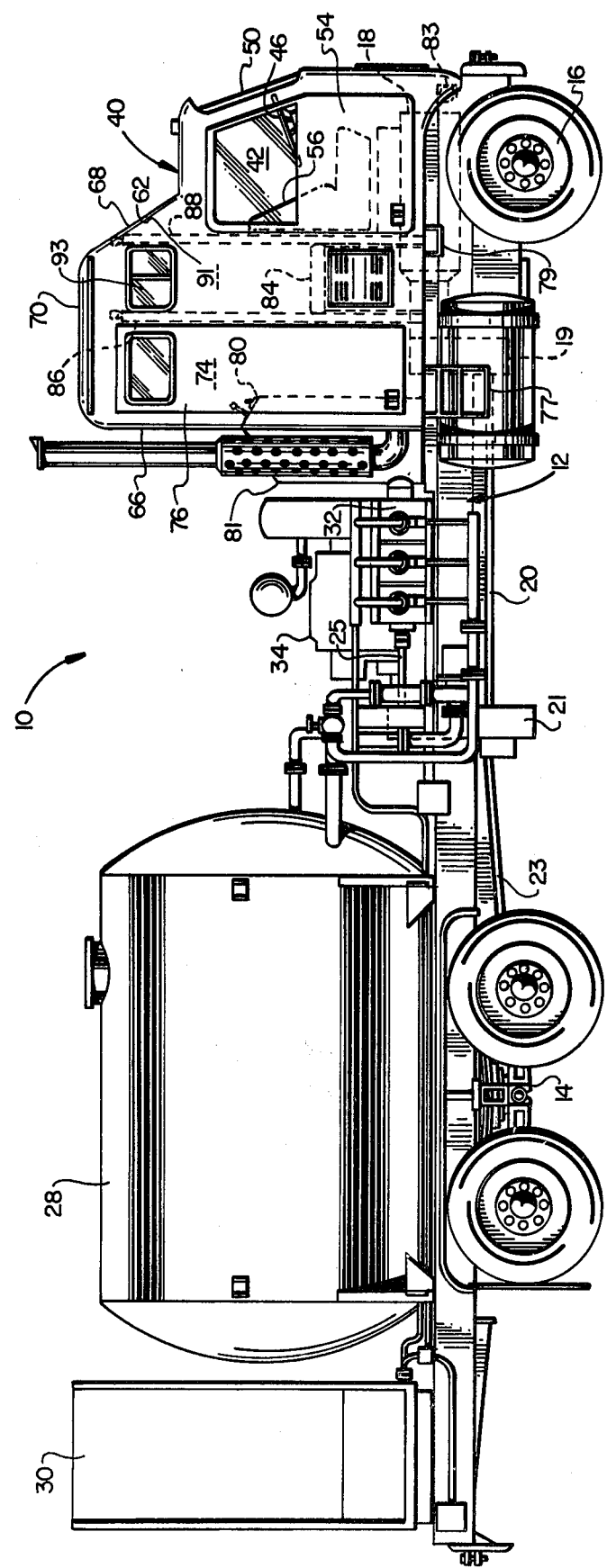
FIG. 1 is a side elevation of a motor truck including the operator cab arrangement of the present invention.

Referring to FIG. 1, there is illustrated a vehicle comprising a motor truck, generally designated by the numeral 10, which is particularly adapted to include a relatively complex arrangement of equipment mounted on board a chassis 12. The truck 10 is of an over-the-road type and includes a powered tandem rear axle unit 14 and a forward steering axle arrangement 16. The chassis 12 is further provided with a forwardly mounted main propulsion engine 18, indicated schematically in FIG. 1, and which is connected to the powered axle unit 14 by way of a conventional multi-speed gear transmission unit 19, driveshaft 20, a transfer case 21 and a propeller shaft 23. The truck 10 is particularly adapted for use as a well servicing unit and includes a relatively complex arrangement of equipment on board the chassis 12 adapted for injecting fluids into subterranean formation under high pressures for enhanced recovery of petroleum deposits. For example, the truck unit 10 includes a liquid nitrogen storage tank 28, a vaporizer unit 30 and a high pressure reciprocating plunger type pump 32 mounted transversely on the chassis 12. The pump 32 includes a crankshaft which is adapted to be driven by the engine 18 through a suitable power transmission arrangement including the transfer case 23 and a power takeoff shaft 25. The aforementioned equipment on board the truck 10 further includes an auxiliary engine 34 for driving suitable hydraulic pumps, not shown, to power various pieces of equipment, for example, a hydraulic motor driven fan for the vaporizer unit 30, a boost pump for pumping liquid nitrogen from the reservoir 28 to the high pressure pump 32 and for supplying hydraulic power to operate various remotely controlled valves and other pieces of equipment, as needed. A detailed description of the equipment mounted on the chassis 12 is not believed to be necessary to describe the best mode of carrying out the present invention. However, it will be appreciated that the equipment on board the truck 10 requires several controls and instruments which must be operated and monitored during use of the equipment and are desirably grouped at a single control station which will be described in further detail hereinbelow.

Referring to FIGS. 1 and 2, the truck 10 includes an operator's cab, generally designated by the numeral 40, disposed on the chassis 12 in a cab-over-engine arrangement. The cab 40 comprises an enclosure defining a driver's compartment, generally designated by the numeral 42. The driver's compartment 42 includes a driver's seat 44, steering wheel 46 and an instrument panel 48 adapted to include the conventional engine instruments and controls normally associated with driving the truck 10. The cab 40 is provided with a conventional forward windshield 50, driver's access door 52 and a door 54 for access to a relief driver's seat 56.

The cab 40 may be of typical monocoque construction including a front wall 60 parallel sidewalls 62 and 64, a rear wall 66, and a stepped roof 68. The roof 68 includes a raised portion 70 including a sloping front wall having a window 72 mounted therein. The cab 40 may be fabricated of suitable tubular metal framing to which is fastened an inner and outer sheet metal or reinforced plastic skin in a conventional manner known in the art of vehicle fabrication.

The cab 40 is provided with an enclosed equipment control station, generally designated by the numeral 74, which is arranged rearwardly of the driver's compartment 42. The roof portion 70 is provided at a height from the floor 73 of the cab to provide standing head room within the area defining the control station 74. Doors 76 and 78 are provided in the cab sidewalls 62 and 64 to provide access to the control station 74 from the cab exterior. The control station 74 includes a control panel, generally designated by the numeral 80, which is mounted on the chassis 12 and includes a cabinet 81 which extends from the rear wall 66 and below a relatively large window 69 disposed across a major portion of the rear wall. Suitable control conduits and cables for the equipment mounted behind the cab 40 are trained between the frame rails of the chassis 12 and into the cabinet 81 for the control panel 80.

The cab 40, being mounted over the main propulsion engine 18, is required to be movable away from the engine for access thereto for servicing and repair. In this regard, the cab 40 is adapted to be pivoted with respect to the chassis 12 to a tilted position as shown in FIG. 3. The cab 40 is provided with suitable hinge means 83 and hydraulic jacks 85, one shown in FIG. 3, provided in accordance with conventional cab-over-engine structures for tilting the cab generally forwardly with respect to the chassis 12 about a pivot point near the forward end of the cab. Accordingly, the rear wall 66 is provided with a recess 67 which is lined with a gasket 82 so that the cab fits in substantial sealing engagement around the periphery of the control cabinet 81. The floor 73 is also suitably recessed at 75 to provide for tilting the cab 40 away from the cabinet 81. As will be appreciated from the foregoing description, the cab 40 may be conveniently tilted away from the control panel 81 without requiring the disconnection of any of the control cables, conduits or other instrument leads.

Referring further to FIG. 2, the cab 40 is advantageously provided with a combination bunk and operator's seat 84 extending across the width of the interior of the cab between the sidewalls 62 and 64 and generally interposed between the driver's compartment 42 and the control station 74. The combination bunk and seat 84 is preferably supported by a transverse frame portion 87 forming a duct through which engine cooling air may be circulated and engine air inlet and exhaust ducting may be routed. The interior of the cab 40 is also provided with a set of partitions comprising folding curtains 86 and 88 mounted on spaced apart overhead support rails 90 which extend between the sidewalls 62 and 64 and generally along opposite longitudinal sides of the bunk 84. The curtains 86 and 88 may be formed of a suitable substantially and opaque material which can be extended across the interior of the cab 40 to form a convertible sleeping compartment, generally designated by the numeral 91 and including, of course, the bunk 84. Windows 92 and 93 are formed in the sidewalls 62 and 64 above the ends of the bunk 84. The windows 92 and 93 may be provided with suitable shades or curtains, not shown, which may also be closed to darken the sleeping compartment 91 when the driver or equipment operator requires a rest period. However, when the truck 10 is on a job site and the equipment is being utilized, the curtains 86 and 88 are normally folded against one sidewall so that the operator at the control station 74 may also advantageously view the instrument panel 48 as well as the panel 80 to monitor the instruments of the main propulsion engine 18 when the engine is being used to drive the pump 32. The bunk 84 also serves as a seat for the operator at the control panel 80 when the curtain 86 is folded.

Those skilled in the art will appreciate that the arrangement of the cab 40, comprising a driver's compartment and an enclosed equipment control station, provides several advantages for operation of a vehicle of the type described herein as well as certain other types of truck units which include on board equipment. By providing the extended enclosure forming the control station 74, an operator of the equipment on board the truck 10 may monitor the performance of the engines 34 and 18 by viewing instruments on the panel 80 and by merely turning his head to view the panel 48 as well. All controls and instruments for the engine 34 as well as controls and instruments for the fluid injection system on board the truck 10 are provided at the control panel 80 and may be conveniently viewed and operated by an operator standing at the control station 74. Moreover, the large window 69 across the rear wall 86 provides a suitable view for an operator within the cab 40 to observe the operation of substantially all of the equipment on the truck which is mounted rearwardly of the cab. Accordingly, the operator is protected from inclement weather as well as noise generated by operation of the equipment. Still further, the operator is also somewhat protected from the hazards associated with malfunctioning equipment. The bunk 84 also advantageously serves as a seat for an operator at the control station 74 whereby he may rest once the equipment has been set to operate at a steady state condition and requires only occasional observance to check for possible leaks or other malfunctions, for example. The arrangement of the instruments and controls on the panel 80 permit the operator to view all of the instrumentation while either standing in front of the panel or seated on the bunk 84. Moreover, as previously described, the operator may merely turn his head to view the instrument panel 48 in the driver's compartment 42 to observe instruments for the engine 18 and hence these instruments need not be duplicated on the panel 74.

As will be appreciated from the foregoing, the cab 40 may be entered through the driver door 52 when the driver is to position himself for driving the truck from one work site to another. Once the truck has arrived at the site for operation of the on board equipment, the operator may enter the rear portion of the cab 40 by climbing over the bunk 84, if desired, or by entering the control station 74 by way of either of the access doors 76 or 78. Suitable access ladders 77 and 79 are provided on the cab 40 below the respective doors on both sides of the cab.

The convertible sleeping compartment 91 may be utilized by closing the curtains 86 and 88 while a relief driver operates the truck or the truck is parked to allow a solo driver to rest. The sleeping compartment 91 may also be utilized while the truck is on the job site and when the equipment on board the truck is not in need of being monitored or controlled.

Although a preferred embodiment of the cab 40 as disclosed herein is of the cab-over engine configuration, those skilled in the art will appreciate that a cab in accordance with the present invention may also be provided for a cab-behind engine arrangement for an equipment truck such as the truck 10. Those skilled in the art will also recognize that various other substitutions and modifications to the specific embodiment of the operator's cab disclosed herein, may be made without departing from the scope and spirit of the present invention as recited in the appended claims.

What is claimed is:

1. In an over the road motor vehicle including a chassis having a main propulsion engine mounted thereon, an operator's cab forming an enclosure defining a driver's compartment for driving said vehicle, said driver's compartment including steering means for said vehicle and an instrument panel for monitoring instruments for said main engine, said cab including a front wall including a windshield formed therein, spaced apart sidewalls, a roof, a rear wall, at least one access door to said driver's compartment, and access doors in each of said sidewalls separate from said one access door to said driver's compartment and opening to a separate control station formed within said enclosure and generally rearward of said driver's compartment, a control panel disposed at sid control station and including means for controlling and monitoring equipment disposed on said vehicle and generally rearward of said cab, a floor forming a part of said enclosure at said control station, and a stepped portion of said roof above said floor providing substantially standing headroom for an operator at said control panel.

2. In an over the road motor vehicle including a chassis having a main propulsion engine mounted thereon, an operator's cab mounted on said chassis generally over said main engine for pivotal movement from a normal operating position to a tilted position to provide access to said main engine, said cab forming an enclosure defining a driver's compartment for driving said vehicle, said driver's compartment including steering means for said vehicle and an instrument panel for monitoring instruments for said main engine, said cab including a front wall including a windshield formed therein, spaced apart sidewalls, a rear wall, and a roof forming said enclosure, a separate control station formed within said enclosure and generally rearward of said driver's compartment, a control panel mounted on said chassis and disposed at said control station, said control panel including means for controlling and monitoring equipment disposed on said vehicle and generally rearward of said cab, a window in said rear wall for viewing said equipment, said window being disposed above said control panel, and said cab includes means forming a recess whereby said cab encloses said control panel in said operating position of said cab.

3. The invention set forth in claim 2 wherein:
said cab includes means defining a sleeping compartment within said enclosure and between said driver's compartment and said control panel.

4. The invention set forth in claim 2 wherein:
said cab includes means forming a bunk disposed transversely within the interior of said cab between said driver's compartment and said control station for supporting a person in a reclining position, and partition means extendable across said enclosure between said control panel and said driver's compartment for forming a sleeping compartment in said cab and defined in part by said bunk.

5. In an over the road motor vehicle including a chassis having a main propulsion engine mounted thereon, an operator's cab forming an enclosure defining a driver's compartment for driving said vehicle, said cab including a windshield formed in a front wall of said enclosure, said driver's compartment including steering means for said vehicle and in instrument panel for monitoring instruments for said main engine, a separate control station formed within said enclosure and generally rearward of said driver's compartment, a control panel disposed at said control station and including means for controlling and monitoring equipment disposed on said vehicle and generally rearward of said cab, means forming a bunk disposed transversely across the interior of said cab between said driver's compartment and said control station for supporting a person in a reclining position, and partition means extendable across said enclosure between said driver's compartment and said control panel for forming a sleeping compartment in said cab and defined in part by said bunk.

6. The invention set forth in claim 5 wherein:
said cab includes a frame portion supporting said bunk at a level with respect to said control panel so that said bunk also forms a seat for an operator facing said control panel.

7. In an over the road motor vehicle including a chassis having a main propulsion engine mounted thereon, an operator's cab forming an enclosure defining a driver's compartment for driving said vehicle, said cab including a windshield formed in a front wall of said enclosure, said driver's compartment including steering means for said vehicle and an instrument panel for monitoring instruments for said main engine, a separate control station formed within said enclosure and generally rearward of said driver's compartment, a control panel disposed at said control station and including means for controlling and monitoring equipment disposed on said vehicle and generally rearward of said cab, means defining a sleeping compartment within said enclosure and between said driver's compartment and said control panel, said means including a bunk within said enclosure and adapted to support a person in a reclining position and in a seated position facing said control panel, and foldable partition means disposed within said enclosure and movable between open and closed positions to substantially close off said sleeping compartment from said driver's compartment and said control station.

8. The invention set forth in claim 7 wherein:
said foldable partition means comprises flexible curtains supported on spaced apart rails mounted in said enclosure generally along opposite longitudinal sides of said bunk.

9. An over the road motor vehicle including a chassis having a main propulsion engine mounted thereon, an operator's cab mounted on said chassis generally over said main engine for pivotal movement between a normal operating position and a tilted position to provide access to said main engine, said cab forming an enclosure defining a driver's compartment for driving said vehicle, said driver's compartment including steering means for said vehicle and an instrument panel for monitoring instruments for said main engine, said cab including a front wall including a windshield formed therein, spaced apart sidewalls, a roof, a rear wall, at least one access door to said driver's compartment, and at least one access door in one of said sidewalls separate from said one access door to said driver's compartment and opening to a separate control station formed within said enclosure and generally rearward of said driver's compartment, a control panel disposed at said control station and including means for controlling and monitoring equipment disposed on said vehicle and generally rearward of said cab, a floor forming a part of said enclosure at said control station, a portion of said roof extending across said enclosure above said floor to provide substantially standing headroom for an operator at said control panel, and means forming a bunk extending across said enclosure between said driver's compartment and said control panel for supporting a person in a reclining position and in a seated position for operating said control panel.

10. The invention set forth in claim 9 including: a window in said rear wall and disposed above said control panel for viewing said equipment from said control station.

11. A roadable motor vehicle including a chassis having a main propulsion engine operable to be selectively drivingly connected to a powered axle, and to machinery mounted on said chassis, and an operator's cab mounted on said chassis and forming an enclosure defining a driver's compartment, said driver's compartment including steering means for said vehicle, and an instrument panel for said engine, a control station formed within said enclosure and including a control panel for said machinery, said control station being arranged within said enclosure whereby an operator for said machinery may observe said control panel and said instrument panel without leaving said control station, means forming a bunk disposed in said enclosure between said driver's compartment and said control panel, said bunk being operable to support a person in a reclining position, and said bunk forming a seat for an operator facing said control panel, and partition means movable between an open position and a closed position extending across said enclosure between said driver's compartment and said control panel for converting at least part of said enclosure into a sleeping compartment, said sleeping compartment including said bunk.

* * * * *